Figure 2:
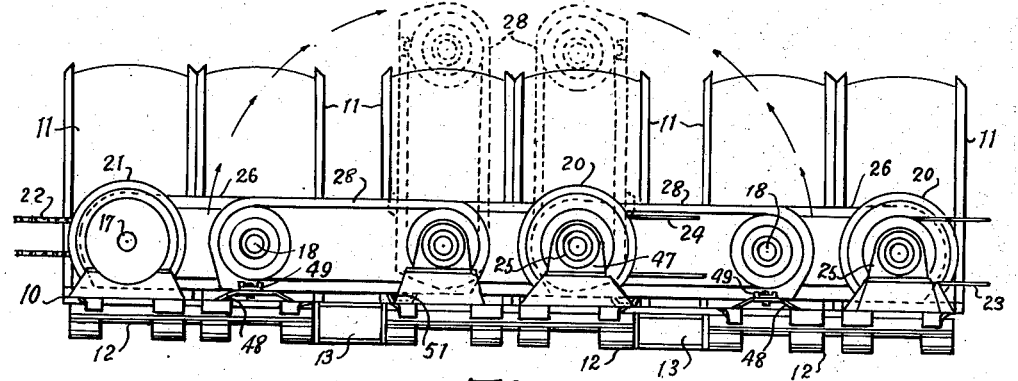

Sept. 18, 1951 T. M. CONE 2,568,385
COMPOUND DRIVE
Filed July 5, 1947 3 Sheets-Sheet 1
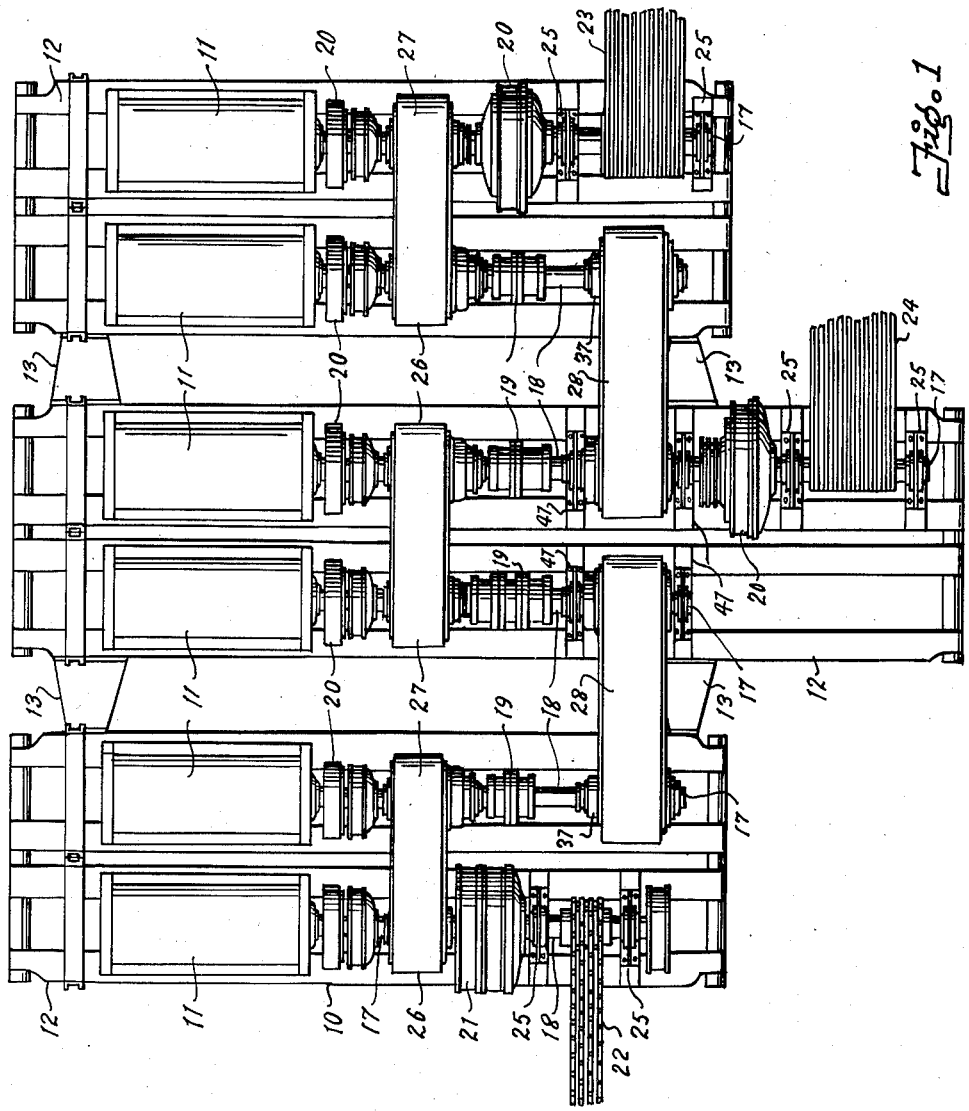
Inventor
Truett M. Cone
By Ahley & Ahley
Attorneys

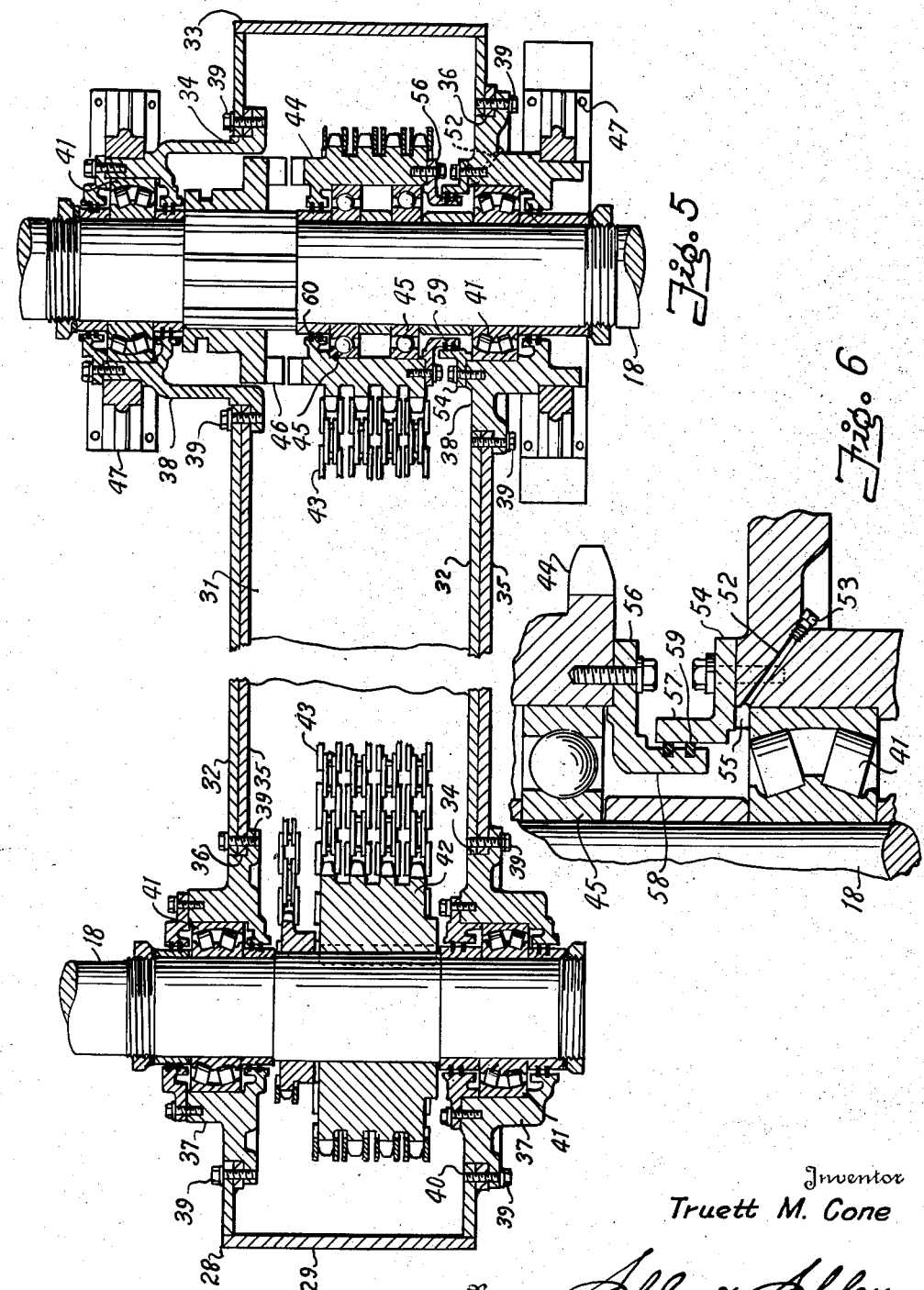

Sept. 18, 1951  T. M. CONE  2,568,385
COMPOUND DRIVE
Filed July 5, 1947  3 Sheets-Sheet 3

Inventor
Truett M. Cone
By Ashley & Ashley
Attorneys

Patented Sept. 18, 1951

2,568,385

UNITED STATES PATENT OFFICE 2,568,385

COMPOUND DRIVE

Truett M. Cone, Fort Worth, Tex., assignor to Mid-Continent Supply Company, Inc., Fort Worth, Tex., a corporation of Delaware Application July 5, 1947, Serial No. 759,177

14 Claims. (Cl. 74—216.5)

This invention relates to new and useful improvements in compound drives and more particularly to drive connections for power units.

It is common practice to compound or interconnect a plurality of internal combustion engines or other prime movers in various types of power units, such as oil well drilling rigs, for transmitting power to the draw works, rotary table, pumps and other equipment. The prime movers are generally connected together in such manner as to drive certain of the equipment individually or simultaneously and their shafts have one or more gears or sprockets or pulleys mounted thereon for receiving power transmitting chains or belts. Suitable clutches are provided for disconnecting certain of the sprockets or pulleys from the shafts upon which the same are mounted to vary the power output and mode of operation. These drive connections are usually enclosed within suitable casings or housings and necessarily have portions of the shafts of adjacent prime movers journaled therein. The majority of such power units are too large to be moved together so that it is necessary to disconnect and separate the prime movers. When this is done, the housings and drive connections must be removed with the result that considerable time is involved in disassembling and reassembling the same.

Therefore, one object of the invention is to provide an improved compound drive which is constructed in such manner as to facilitate assembly and disassembly of the same.

Another object of the invention is to provide an improved compound drive having novel means for connecting the prime movers of a power unit whereby said prime movers may be readily disconnected and separated without removing the connecting means.

A particular object of the invention is to provide an improved drive connection for a power unit, such as an oil well drilling rig, wherein the shafts of adjacent prime movers are connected by means supported upon one shaft or its journals and removably attached to the other shaft whereby the connecting means is carried by and removed with one of the prime movers.

An important object of the invention is to provide an improved drive connection, of the character described, having a housing for enclosing the connecting chains and sprockets of adjacent prime mover shafts, the housing being journaled upon one of the shafts or its support and having the other shaft journaled therein, whereby said housing may be swung upwardly about the axis of said first shaft when said other shaft is broken to facilitate removal and transportation of said prime movers.

A further object of the invention is to provide an improved drive connection, of the character described, wherein the housing has means for supporting it in a horizontal plane when said housing is swung downwardly about the axis of the shaft upon or about which it is journaled whereby said housing may be readily connected to the support of an adjacent prime mover.

A construction designed to carry out the invention will be hereinafter described together with other features of the invention.

Figure 3:
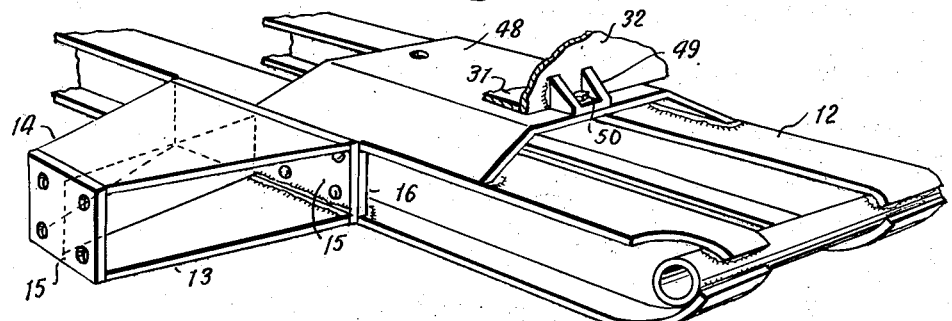
Figure 4:
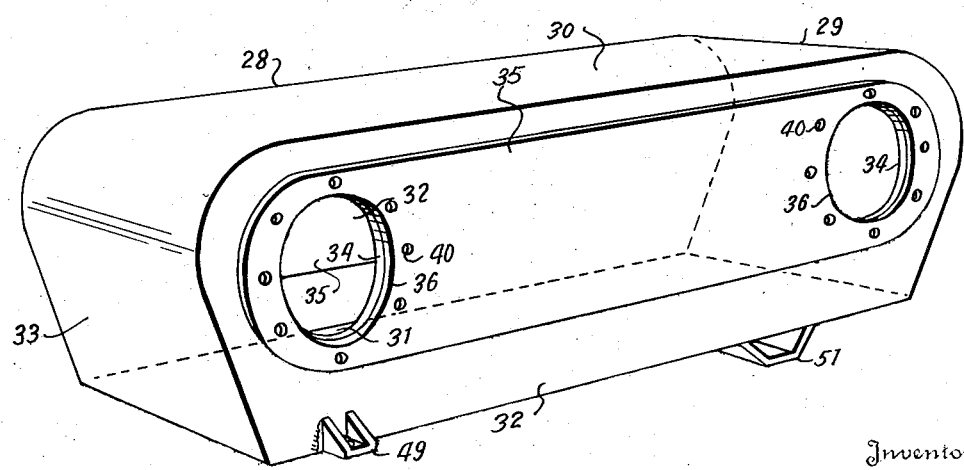

The invention will be more readily understood from a reading of the following specification and by reference to the accompanying drawings, wherein an example of the invention is shown, and wherein:

Fig. 1 is a plan view of a power unit having a compound drive constructed in accordance with the present invention, Fig. 2 is a front elevational view of the power unit, Fig. 3 is a perspective view of a portion of one of the prime mover supports, Fig. 4 is a perspective view of one of the drive connection housings, with the shafts and bearings removed, Fig. 5 is a horizontal, cross-sectional view of the housing, showing the relation of its shafts thereto, and Fig. 6 is a detailed view, showing the means for lubricating the drive connection carried by the housing.

In the drawings, the numeral 10 designates a power unit in the form of an oil well drilling rig which includes a plurality of internal combustion engines or prime movers 11 mounted upon skids or supports 12. Although the prime movers have been illustrated as being mounted in pairs, it is manifest that an individual skid may be provided for each prime mover. For connecting and spacing the skids 12 from each other, suitable spacers 13 are provided between adjacent skids near the ends thereof. Each spacer 13 includes a short beam or member 14 which is substantially H-shaped in cross-section and rests on one of its sides. Transverse, vertical plates 15 are welded or otherwise secured to the ends of the member and abut and are bolted or otherwise detachably connected to plates 16 which are carried by the lateral margins or sides of adjacent skids (Fig. 3). If desired, one end of each bracket 13 may be of greater transverse width than the other end thereof.

As is clearly shown in Fig. 1, each prime mover 11 includes a main shaft 17 which is composed of a plurality of alined sections or extensions 18. The latter are commonly referred to as power take-off shafts and are releasably connected to one another by suitable couplings 19. Conventional air clutches 20 are disposed between certain of the sections 18 of the shaft 17 in place of the couplings 19. A master clutch 21 is connected in the shaft of the left-hand prime mover, which shaft has driving engagement with an endless chain 22 for operating the usual draw works (not shown). Conventional mud pumps (not shown) are adapted to be connected by endless V-belts 23 and 24 to the shaft of the right-hand prime mover and the shaft of one of the intermediate prime movers, respectively, it being pointed out that the intermediate skid may be of greater length than the end skids so as to project therebeyond for accommodating the belts 24. The shaft sections 18 are supported by pillow blocks or pedestal bearings 25 which are suitably secured to the skids 12.

The prime movers which are mounted upon a common skid have their shaft sections drivingly connected by means of suitable drive connections 26. The connections include oil-tight casings or housings 27, which are supported by the skids, for enclosing an endless chain or V-belt and sprockets or pulleys which have not been illustrated but which are the same as shown in Fig. 5. Similar drive connections 28 connect the shaft sections of adjacent prime movers which are mounted upon separate or different skids and these drive connections are very similar to the drive connections 26. As is most clearly shown in Figs. 4 and 5, each drive connection 28 includes an enclosure 29 in the nature of oil-tight housing or casing. Although subject to variation, each casing 29 is shown as being of substantially rectangular shape having a flat top, bottom and side walls 30, 31 and 32, respectively, and vertically curved end walls 33. The top 30 is ordinarily removable, but has not been illustrated in such manner for the sake of simplicity.

Openings or apertures 34 are formed in the end portions of each side wall 32 adjacent the ends 33 of the casing for receiving the shaft sections 18 of adjacent prime movers mounted upon separate or different skids. The side walls 32 are reinforced by suitable plates 35 which are of less length than said side walls and which have complementary openings or apertures 36 registering with the openings 34. One of the plates 35 is mounted externally of its side wall, while the other plate is disposed internally of its side wall (Fig. 5). Suitable bearing boxes 37 are mounted in one pair of alined openings 34 and 36, while similar bearing boxes 38 engage within the other pair of alined openings. The bearing boxes 37 and 38 are secured within their respective openings by suitable bolts 39 which are screw-threaded into openings 40 formed in the side walls and reinforcing plates in surrounding relation to said apertures. A conventional bearing 41 is confined within each bearing box for receiving and rotatably supporting one of the shaft sections 18.

The shaft section which is journaled in the boxes 37 has a sprocket 42 keyed or otherwise secured thereupon. An endless chain 43 engages the sprocket 42 and connects the same to a sprocket 44 which is rotatably supported upon the shaft which extends through the boxes 38 by a bearing assembly 45. Manifestly, pulleys and V-belts may be employed in place of the sprockets and chains. The sprocket 44 is adapted to be drivingly connected to its shaft section by a positive clutch 46 which is splined or otherwise slidably mounted upon said shaft section. This clutch is of conventional construction, being shown as of the jaw-type, and is adapted to be engaged and disengaged in the usual manner by means of suitable operating means (not shown). One of the boxes 38 is preferably enlarged or elongated to accommodate the clutch and its operating means.

For rotatably supporting the boxes 38, a pair of trunnions 47 are bolted or otherwise secured to the skid therebelow (Figs. 1, 2, and 5). Due to this arrangement, one end of the casing 29 is supported by the trunnions 47 and supports the other shaft section at its opposite end. The latter end of the casing rests upon an angular plate or bracket 48 which is welded or otherwise secured to the skid therebelow as shown in Fig. 3. Suitable lugs 49 are welded, or otherwise secured to the casing side walls 32, and are adapted to be secured to the bracket 48 by bolts 50. Additional means of support is provided adjacent the pivotally mounted end of the casing in the form of a foot or stop member 51 which extends transversely across the casing bottom 31 so as to engage the upper surface of the skid upon or above which said casing is pivotally mounted.

By disconnecting the lugs 49 from the bracket 48, each casing 29 may be swung or pivoted upwardly due to the rotatable mounting of the bearing boxes 38 within the trunnions 47. Of course, it is necessary to uncouple the shaft section which is journaled or rotatably supported in the bearing boxes 37. Upon swinging the casings 29 upwardly (Fig. 2) and disconnecting the brackets 13, the skids 12 may be readily separated and transported from one location to another. Due to the pivotal mounting of the casings 29, this separation of the skids is materially simplified and the laborious task of entirely removing the casing and the drive connection housed therein is eliminated. Manifestly, the drive connections 28 are completely out of the way and do not interfere with transportation or storage of the skids. When it is desired to again connect the shafts of the prime movers, it is only necessary to swing the casings downwardly until their stop members 51 engage the respective supports of said casings, which engagement maintains the casings in a horizontal plane. The adjacent skid or skids may be positioned before or after this downward movement of the casings. In any event, the casings may be readily connected to their brackets 48 by means of the lugs 49 and bolts 50 and adjacent skids may be connected by the brackets 13. Upon recoupling the shaft sections supported by the bearing boxes 37 of each casing, the compound driving connection is completed and the power readied for operation.

In order to lubricate the bearing assembly 45 which rotatably supports the sprocket 44 upon one of the shaft sections within the casing 29, a duct 52 extends through the adjacent box 38 and has its inner end terminating inwardly of the bearing 41 mounted in said box. A screw-threaded plug 53 engages in the outer end of the duct 52 for permitting the introduction of a suitable lubricant therethrough. The confining ring 54, which maintains the bearing 41 in position within the box 38 by being bolted or otherwise secured to the inner surface of said box, has a port or opening 55 in communication with the inner end of the duct 52. A similar ring 56 is bolted, or otherwise secured, to the sprocket 44 for confining the bearing assembly therein. Co-acting flanges 57 and 58 are provided on the rings 54 and 56, respectively, and have packing members or sealing elements 59 interposed therebetween to prevent the escape of the lubricant. Thus, lubricant introduced through the duct 52 and port 55 is confined between the shaft section and the flanges of the bearing confining rings so as to be directed to the bearing assembly 45. Packing members 60, similar to the members 59, are preferably interposed between the opposite ends of the sprocket 44 and the shaft section for retaining the lubricant therebetween. Incidentally, the bearing 41 enclosed within the adjacent box 38 is also lubricated by this arrangement.

From the foregoing, it will be readily apparent that a novel drive connection of simplified construction has been provided. Due to the arrangement of this drive connection, a power unit having a plurality of prime movers and a compound drive may be quickly and readily assembled or disconnected. The drive connections 28 not only facilitate separation of the skid-mounted prime movers but also materially reduce the space required for transportation and storage of said skids due to the pivotal mounting which permits upward swinging of the casings 29. Although these casings have been shown as being pivotally mounted upon the intermediate skid, it is pointed out the same could be mounted in a similar manner upon the end or outer skids. When the prime movers are mounted in pairs upon a common skid there is no necessity for pivotally mounting their drive connections 26; however, the casings 27 may be pivotally mounted in the same manner as the casings 29 in the event that the prime movers are mounted upon individual or separate skids. In all other respects, the drive connections 26 and 28 are substantially alike.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A compound drive for a pair of shafts having releasably connected sections, a driving connection between certain of the sections of adjacent shafts, means enclosing the driving connection and said drivingly connected shaft sections, and bearing means carried by the enclosing means for receiving the latter shaft sections and rotatably connecting the same to said enclosing means, whereby said enclosing means and one of said shaft sections may be pivoted about the other shaft section upon disconnection of the first shaft section from its shaft.

2. A compound drive as set forth in claim 1 including, means supporting one of the bearing means whereby the enclosing means is pivotally mounted upon one shaft section and has the other shaft section journaled therein.

3. A compound drive as set forth in claim 1 wherein the enclosing means includes a housing having the bearing means mounted therein, one of said bearing means being rigidly supported externally of the housing so as to pivotally support said housing.

4. A compound drive for a pair of shafts, one of the shafts having an alined releasably connected section, a drive connection between the shaft section and the other shaft, means enclosing the drive connection, bearings carried by the enclosing means for receiving said other shaft and shaft section and rotatably connecting the same to said means, whereby said means and shaft section may be pivoted about said other shaft upon disconnection of said section from its shaft.

5. A compound drive as set forth in claim 4 wherein the bearing receiving the shaft is rigidly supported externally of the enclosing means so as to support said means for pivotal movement relative thereto.

6. A drive connection for a pair of shafts, one of the shafts having an extension in alinement therewith, means releasably connecting the extension to its shaft for rotation therewith, means drivingly connecting said extension and the other shaft, a casing enclosing the drive connection, a bearing mounted in the casing for receiving said shaft extension and rotatably connecting the same to said casing, and means pivotally supporting one end of said casing whereby the casing and extension may undergo pivotal movement upon release of the releasable connecting means.

7. A drive connection as set forth in claim 6 wherein the drive means includes sprockets mounted upon the shaft and shaft extension within the casing, and a chain engaging and connecting the sprockets.

8. A drive connection as set forth in claim 6 including, means for supporting the casing in a position wherein the shaft extension is alined with its shaft to facilitate release and engagement of the connecting means.

9. In combination with a pair of shafts, the shafts being disposed in spaced parallel relation, certain of said shafts having extensions in alinement therewith and releasably connected thereto, said shafts and extensions having power transferring means mounted thereon and drivingly connected, a drive connection including, an enclosure for the power transferring means and connection therebetween of an adjacent shaft and shaft extension, and bearings mounted in the enclosure for receiving the adjacent shaft and shaft extension, whereby said enclosure and extension may be pivoted about the axis of said shaft upon disconnection of said extension from its shaft.

10. In combination with a pair of shafts formed in sections releasably connected to one another, the shafts being disposed in spaced parallel relation, the parallel sections of adjacent shafts being drivingly connected by chains and sprockets, a drive connection including, a casing enclosing the chain and sprockets of a pair of adjacent parallel shaft sections, and bearings mounted in each casing for receiving a pair of adjacent parallel shaft sections, whereby the casing and one of said shaft sections may be pivoted about the other shaft section when the first shaft section is disconnected from its shaft.

11. The combination set forth in claim 10 including, means externally of the casing for rigidly supporting one of the bearings so as to pivotally support said casing.

12. A drive connection for a pair of parallel shafts including, an oil-tight casing having transverse openings therein adjacent its ends, bearings mounted in the openings for receiving and rotatably supporting the shafts, a sprocket mounted upon each shaft within the casing, a chain engaging and connecting the sprockets, and blocks externally of said casing connected to and rigidly supporting the bearings of one shaft and thereby pivotally support said casing so as to permit swinging of the casing and the other shaft relative thereto.

13. A drive connection for a pair of shafts including, a rigid casing, the shafts extending transversely within the casing adjacent opposite ends thereof, means within said casing drivingly connecting said shafts, one of said shafts being journaled in one end of said casing, and means pivotally supporting the opposite end of said casing and having the other shaft journaled therein so as to permit swinging of said casing and the shaft journaled therein about the axis of said shaft journaled in the supporting means.

14. A drive connection for a pair of shafts including, a rigid casing, pairs of alined transverse openings in opposite ends of the casing for receiving the shafts, bearing means in one pair of openings for rotatably supporting one of said shafts, means within said casing drivingly connecting said shafts, and trunnion means pivotally supporting the opposite end of said casing and having the other shaft journaled therein whereby said casing and said rotatably supported shaft may be pivoted about the axis of said other shaft journaled in the trunnion means.

TRUETT M. CONE.

REFERENCES CITED

The following references are of record in the file of this patent:

UNITED STATES PATENTS

| Number | Name | Date |
| --- | --- | --- |
| 612,139 | Richards | Oct. 11, 1898 |
| 1,097,217 | Ferguson | May 19, 1914 |
| 2,282,597 | Archer | May 12, 1942 |
| 2,355,272 | Cardwell | Aug. 8, 1944 |